(12) United States Patent
Davis et al.

(10) Patent No.: US 10,096,058 B1
(45) Date of Patent: Oct. 9, 2018

(54) CONNECTED INVENTORY SYSTEMS TO ENABLE CUSTOMER FULFILLMENT

(71) Applicant: INTUIT INC., Mountain View, CA (US)

(72) Inventors: Molly Beth Davis, Mountain View, CA (US); Ashlee Beggs, Mountain View, CA (US); Roger Meike, Mountain View, CA (US); Todd Elliott, Mountain View, CA (US); Mike Gabriel, Mountain View, CA (US)

(73) Assignee: Intuit Inc., Mountain View, CA (US)

(*) Notice: Subject to any disclaimer, the term of this patent is extended or adjusted under 35 U.S.C. 154(b) by 90 days.

(21) Appl. No.: 15/222,622

(22) Filed: Jul. 28, 2016

(51) Int. Cl.
*G06Q 30/00* (2012.01)
*G06Q 30/06* (2012.01)
*G06Q 10/08* (2012.01)

(52) U.S. Cl.
CPC ..... *G06Q 30/0637* (2013.01); *G06Q 10/0875* (2013.01)

(58) Field of Classification Search
CPC .......................................... G06Q 30/06–30/08

USPC ................................................ 705/26.1–27.2
See application file for complete search history.

(56) References Cited

U.S. PATENT DOCUMENTS 8,612,304 B1* 12/2013 Lin ...................... G06Q 10/087
705/26.1
2011/0258079 A1* 10/2011 Ngan ..................... G06O 20/12
705/26.44

* cited by examiner

*Primary Examiner* — Ethan D Civan
(74) *Attorney, Agent, or Firm* — Patterson + Sheridan LLP

(57) ABSTRACT

The present disclosure includes methods for fulfilling a request using a connected inventory fulfillment service. Entities that use the same financial application to store inventory data are invited to participate as participating providers in a connected inventory fulfillment service. When a request for a product for fulfillment using the connected inventory fulfillment service is received, participating providers that could fulfill the request are identified by matching information in the request to inventory data stored using the financial application. A participating provider that could fulfill the request is then selected to fulfill the request.

20 Claims, 6 Drawing Sheets

CONNECTED INVENTORY SYSTEMS TO ENABLE CUSTOMER FULFILLMENT

BACKGROUND

Field

The present disclosure generally relates to using computerized inventory management systems to fulfill customer orders. More specifically, the present disclosure provides techniques for connecting computerized inventory management systems for multiple entities to fulfill orders.

Related Art

Businesses, especially smaller businesses, often carry a limited inventory in any given geographic location, limiting their ability to fulfill orders within fast time requirements and across varied geographic locations. Accordingly, for a business to be able to fulfill a customer's order, the customer may have to wait to receive the item until the business is able to obtain the item in its inventory or the customer may have to pay shipping costs to have the item shipped to a desired location.

Because smaller businesses have limited inventory, they risk losing customers completely to other businesses when they cannot satisfy the customer's request. A customer may use a different smaller business to meet its requests, and that customer may become loyal to the new smaller business. Additionally, a customer may be unwilling to deal with small businesses at all if the customer can have all of its requests satisfied by a single larger business.

Connecting the inventories available from different businesses could provide a wider range of fulfillment opportunities for each business. However, there are several difficulties in connecting the inventories of individual businesses. For example, a business may be unwilling to agree to connect with other businesses due to a lack of trust. Further, a business may be unwilling to spend time and resources developing relationships and agreements with other businesses to connect inventories.

DETAILED DESCRIPTION

Figure 1:
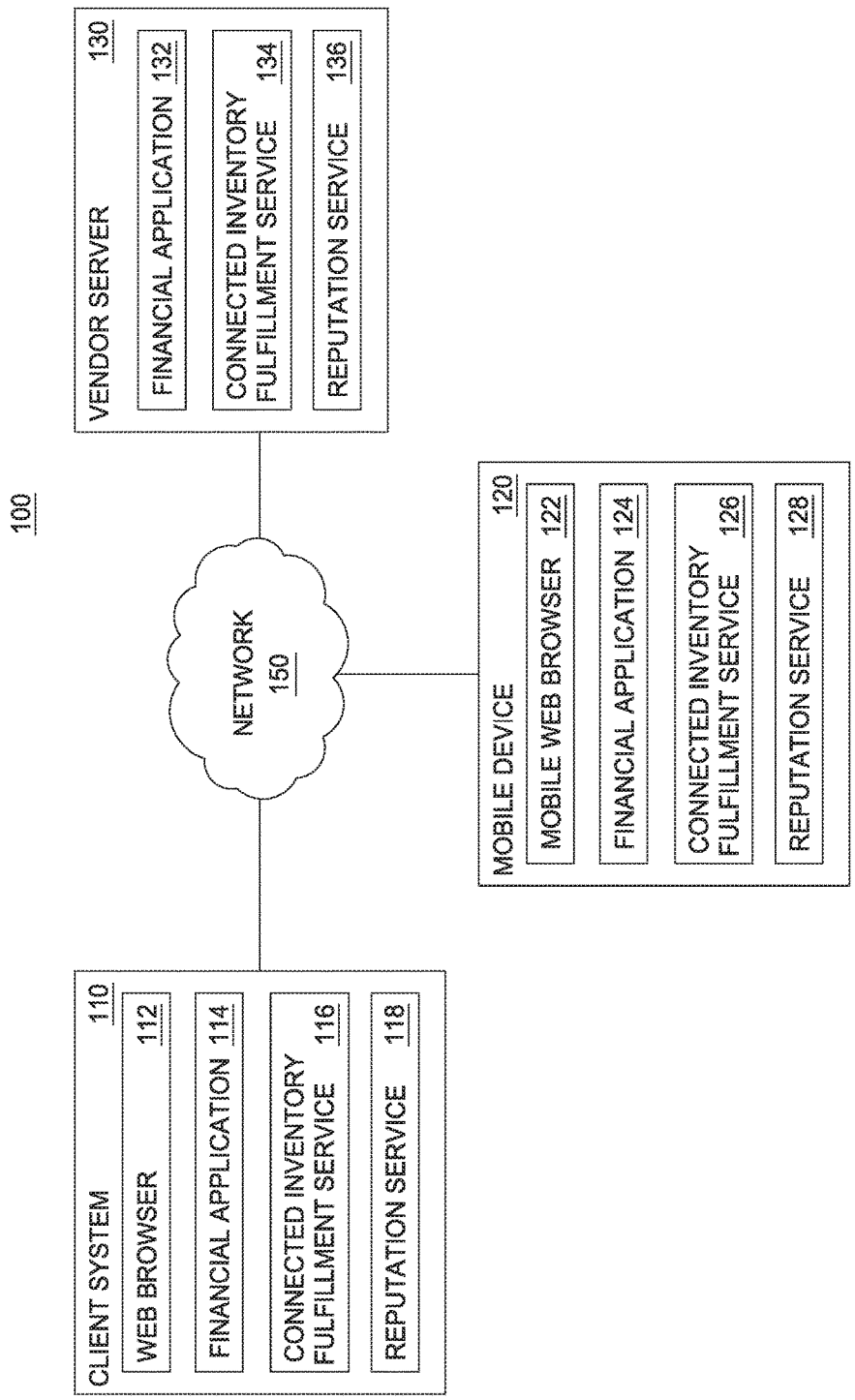
FIG. 1 illustrates an example computing environment that may be used to apply techniques of the present disclosure.

Business entities often use automated inventory systems for real-time detection and monitoring of what products are present in an inventory at any given time. Additionally, businesses often use accounting and other financial software applications to maintain and store records related to the business, including inventory data detected using the business's automated inventory system.

Embodiments presented herein provide techniques for connecting inventories from multiple businesses that use the same financial software to store their inventory data. In one embodiment, entities using a common financial application, such as an inventory management tool, are invited to participate as providers in a connected inventory fulfillment service. When a request for a product for fulfillment using the connected inventory fulfillment service is received, the request is matched by a backend connected inventory fulfillment service on a vendor server to inventory data stored using a financial application on a client system. Based on this matching, a participating provider is then selected to fulfill the request. This connected network of inventories allows a seller to fulfill customer needs even if the seller does not have a product requested by a given customer. Because use of the same financial application connects otherwise independent sellers, the sellers are able to be connected at a much larger scale than if the entities were to establish the connections on their own. Further, because the entities are connected through their use of the same financial application to store financial records and data, the entities may be more likely to participate in the connected network of inventories. Additionally, a reputation service associated with the connected inventory fulfillment service may gather feedback from customers that can be used to ensure that the participating entities meet a certain reputation threshold.

Each request for a product using the connected inventory fulfillment service may include a geographic location. The geographic location may specify a location for fulfillment of the product, and this location may be different from the location from which the request is made.

To identify participating providers that could fulfill the request, the connected inventory fulfillment service matches the request to inventory data stored by users using a financial application on a client system. For example, the backend connected inventory fulfillment service may match entities that use the financial application that have at least one characteristic in common with the requesting entity, filter the identified entities that are agreed participating providers in the connected inventory fulfillment service, filter the identified entities that satisfy a reputation threshold, and filter the identified entities that have the requested product in their inventory in a geographic location included in the request.

Once providers that could fulfill the request are identified, a provider is selected to fulfill the order. The selection may be based on a variety of factors, such as the condition of the product available from a given provider, a guarantee offered by the provider, a price, a geographic location of the product, delivery options, and the reputation of the provider. The selection may also be based on preferences of the requesting party included in the request.

Businesses that request products for their customers using the connected inventory fulfillment service may be recruited to participate as providers in the future. In one embodiment, if a requesting party is not already a participating provider, and the requesting party uses the financial application to store inventory data, an invitation may be sent to the requesting party to participate as a provider in the connected inventory fulfillment service.

FIG. 1 illustrates an example computing environment 100 that may be used to apply techniques of the present disclosure. As shown, the environment 100 includes a client system 110, a vendor server 130, and a mobile device 120, which all communicate via a network 150. The vendor server 130 is executing a backend financial application 132, a backend connected inventory fulfillment service 134, and a backend reputation service 136. Client system 110 is executing financial application agent 114, connected inventory fulfillment service agent 116, and reputation service agent 118. Mobile device 120 is executing financial application agent 124, connected inventory fulfillment service agent 126, and reputation service agent 128. As shown, client system 110 includes a web browser 112, and mobile device 120 includes a mobile web browser 122.

Figure 2:
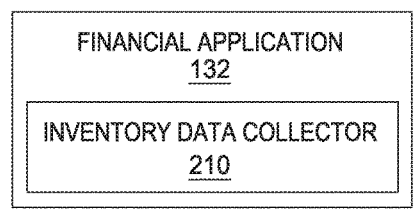
FIG. 2 is a detailed view of a financial application, according to one embodiment.

FIG. 2 is a detailed view of financial application 132, according to one embodiment. The financial application 132 is a backend platform located on vendor server 130. Financial application 132 may be an inventory management tool. Financial application 132 includes an inventory data collector 210 that collects inventory data for users of a financial application agent 114, 124. Sellers using a financial application agent 114, 124 at a client system 110 or a mobile device 120 may have automated inventory detection systems used to detect products available in their inventory. Such automated inventory detection systems may use a variety of mechanisms to monitor and detect changes to a business's inventory, such as sensors, bar codes, RFID, or any other mechanism that may track the products available in the inventory. A seller may connect its automated inventory detection system with financial application 132 using a financial application agent 114, 124 at a client system 110 or a mobile device 120 such that the inventory data detected using the inventory detection system may be collected and stored by the inventory data collector 210 of financial application 132. The inventory data collector 210 collects and stores the inventory data as it is detected, possibly in real-time, by each user's inventory detection system. The inventory data collected for sellers by the inventory data collector 210 is stored at vendor server 130.

Figure 3:
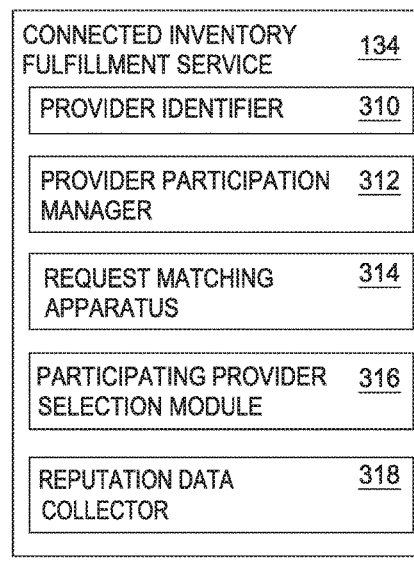
FIG. 3 is a detailed view of a connected inventory fulfillment service, according to one embodiment.

FIG. 3 is a detailed view of a connected inventory fulfillment service 134, according to one embodiment. The connected inventory fulfillment service 134 is a backend platform located on vendor server 130. Connected inventory fulfillment service 134 includes a provider identifier 310 that identifies a specific user of financial application 132 that stores its inventory data using a financial application agent 114, 124 at a client system 110 or a mobile device 120. In one example, provider identifier 310 only identifies a user of financial application 132 whose inventory data is collected and stored in real-time by the inventory data collector 210. In another example, provider identifier 310 only identifies potential providers that satisfy a reputation threshold. The reputation data collector 318 may retrieve reputation data for a user of financial application 132 from reputation service 136 executing on vendor server 130. Provider identifier 310 may use the retrieved reputation data to confirm that a provider satisfies a reputation threshold. Reputation thresholds may be selected to reflect provider reputations desired by customers.

To enroll participating providers in the connected inventory fulfillment service 134, in one embodiment, the provider participation manager 312 in the connected inventory fulfillment service 134 on the vendor server 130 sends an invitation to a user identified by the provider identifier 310. The invitation invites the user to participate as a provider in connected inventory fulfillment service 134. The provider participation manager 312 receives user responses from a financial application agent 114, 124 at a client system 110 or a mobile device 120 to the invitations. If the user accepts the invitation, the provider participation manager 312 classifies the user as a participating provider and stores participating provider data at vendor server 130.

A request matching apparatus 314 in the connected inventory fulfillment service 134 on the vendor server 130 receives a party's request for a product from a connected inventory fulfillment service agent 116, 126 at a client system 110 or a mobile device 120. Alternatively, the request may come from a financial application agent 114, 124 at a client system 110 or a mobile device 120. The request may come from an entity that cannot fulfill its customer's need for a specific product. Or in another embodiment, the request may come directly from a customer in need of a product. The request matching apparatus 314 identifies the product in the party's request as well as any additional information included in the request related to various request categories. For example, the request categories may be related to the condition of the product, guarantee requirements or preferences, price of the product, geographic location of the product, delivery of the product, reputation of the provider of the product, or any other category related to the product or a future transaction involving the product. In one embodiment, the party's request may include a form specifying the product and information provided by the party with respect to each request category. The information specified by the requesting party may indicate preferences or requirements. In one embodiment, the request matching apparatus 314 may apply a set of rules to identify information associated with the categories in the request.

The request matching apparatus 314 matches the product and any additional information identified in the request to data stored by users using a financial application agent 114, 124 at a client system 110 or a mobile device 120, including inventory data, condition data, guarantee data, price data, geographic location data, delivery data, or any other data related to products or potential transactions. Such data may be stored at vendor server 130 and classified or organized according to the applicable request categories. For example, the product in the request is compared to products in stored inventory data. The additional information related to each request category is compared to stored data corresponding to the applicable category. Additionally, the reputation data collector 318 in the connected inventory fulfillment service 134 on the vendor server 130 may retrieve reputation data for users from reputation service 136 at vendor server 130. The request matching apparatus 314 may match information in the request related to reputation preferences to the retrieved reputation data.

The participating provider selection module 316 in the connected inventory fulfillment service 134 on the vendor server 130 selects a participating provider to fulfill the request. The participating provider selection module 316 determines match scores between the information in the request and data related to participating providers based on the matching performed by the request matching apparatus 314. The match scores are calculated by determining the number of matches between the information in the request and stored data related to a given participating provider. The match scores may also be weighted depending on preferences specified in the request, or based on any other desired or measured preferences. The match scores may be weighted using reputation data retrieved by reputation data collector 318 from reputation service 136. The participating provider selection module 316 may rank the match scores and select the highest ranked participating provider to fulfill the request.

Figure 4:
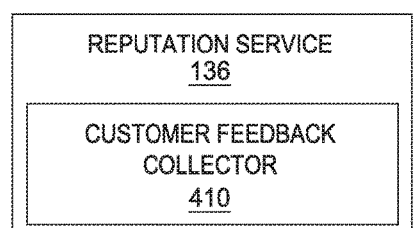
FIG. 4 is a detailed view of a reputation service, according to one embodiment.

FIG. 4 is a detailed view of a reputation service 136, according to one embodiment. The reputation service 136 is a backend platform located on the vendor server 130. Reputation service 136 includes a customer feedback collector 410. The customer feedback collector 410 retrieves feedback from customers regarding their transactions involving products provided by entities that use a financial application agent 114, 124. The feedback from customers may include feedback regarding requests fulfilled using the connected inventory fulfillment service 134. For example, after a request for a product is fulfilled by a participating provider using the connected inventory fulfillment service 134, the customer feedback collector 410 may send a request to the customer to obtain information related to the received product and/or the participating provider that fulfilled the request. In response, the customer may provide feedback using a reputation service agent 118, 128 at a client system 110 or a mobile device 120. Alternatively, the customer may provide feedback using a financial application agent 114, 124 or a connected inventory fulfillment service agent 116, 126 at a client system 110 or a mobile device 120. If the customer feedback collector 410 receives information from a customer in response to the request, customer feedback collector 410 may store this information as reputation data at vendor server 130.

Figure 5:
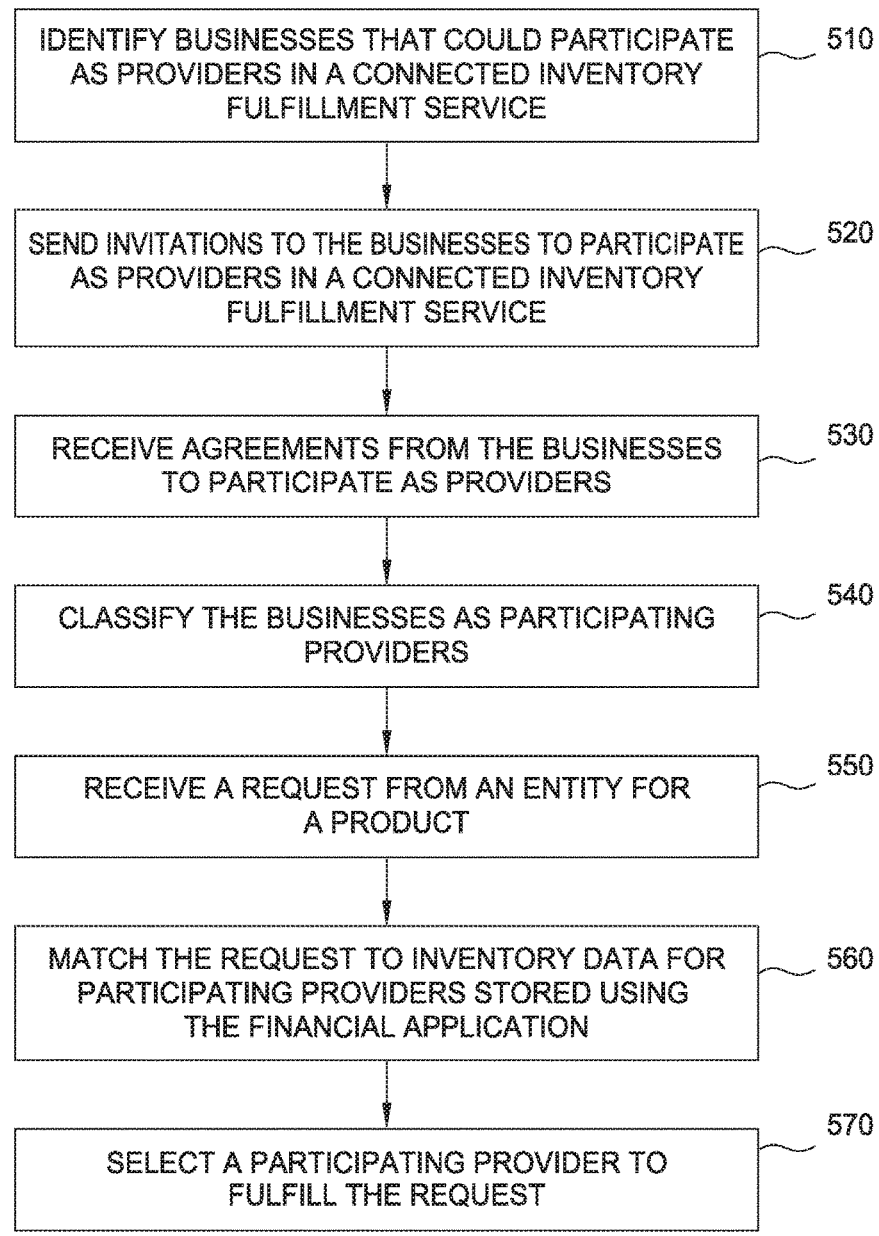
FIG. 5 illustrates a method for fulfilling a request using a connected inventory fulfillment service, according to one embodiment.

FIG. 5 illustrates a method 500 for fulfilling a request using a connected inventory fulfillment service 134, according to one embodiment. As shown, method 500 begins at block 510 with identifying entities that could participate as providers in connected inventory fulfillment service 134. Entities that use the same financial application agent 114, 124 to store inventory data are identified. In some embodiments, only those users that satisfy a reputation threshold may be identified as possible providers. Reputation thresholds may be selected or adjusted at any time to reflect a customer desired reputation requirement for participating providers.

At block 520, invitations are sent to entities identified at block 510 as possible entities that could participate as providers in connected inventory fulfillment service 134. The invitations invite the identified entities to participate as providers in connected inventory fulfillment service 134. The invitations may include additional information, terms, or conditions related to the participation. Each invitation may invite the entity to participate generally as a provider, or alternatively, the invitation may only invite the entity to participate with limited participation. For example, the invitation may only invite the entity to participate as a provider with respect to a specific product or with respect to a specific geographic location.

At block 530, agreements are received from one or more of the entities in response to the invitations to participate as providers in connected inventory fulfillment service 134. The agreements received at block 530 may include an acceptance of all the terms and conditions in the corresponding invitation. At block 540, the entities that agreed to participate are classified as participating providers. Such classification, and any information, terms, or conditions related to each entity's participation may be stored as participating provider data at vendor server 130.

At block 550, a request is received from an entity for a given product. The request may include information such as a preferred or required condition of the product, a preference or a requirement for a guarantee with the product, a preferred or required price of the product, a preferred or required geographic location of the product, a preference or requirement regarding delivery of the product, a preference or requirement regarding reputation of the provider of the product, or any other preference or requirement related to the product or a potential transaction involving the product. In some cases, the request may be received from an entity that is a participating provider in connected inventory fulfillment service 134. For example, the request may be from a business that also provides products through the connected inventory fulfillment service 134. Alternatively, the request may be received from an entity that is not a participating provider and/or is does not use financial application agent 114, 124 to store data. The request may be received from an entity that is submitting the request on behalf of a customer looking to purchase or lease the product requested. Alternatively, the request may be submitted directly from the customer looking to purchase or lease the product requested.

At block 560, the request is matched to inventory data for participating providers stored using a financial application agent 114, 124. For example, the product in the request is matched to products in the inventory data of participating providers stored using a financial application agent 114, 124. Additional information in the request may also be matched to other data stored using a financial application agent 114, 124, such as condition data, guarantee data, price data, geographic location data, delivery data, or any other data stored using financial application agent 114, 124. Additionally, reputation data regarding one or more participating providers may be retrieved from reputation service 136 to match reputation information in the request to the retrieved reputation data.

At block 570, a participating provider may be selected to fulfill the request. The participating provider may be selected by determining match scores between information in the request and data related to participating providers stored using a financial application agent 114, 124 and/or retrieved from the reputation service 136. The match scores may be calculated by determining a number of matches between the information in the request and data stored using a financial application agent 114, 124 or retrieved from the reputation service 136 related to each participating provider. The match scores may be weighted depending on preferences specified in the request, or based on any other desired preferences. The match scores may also be weighted using reputation data related to the participating providers retrieved from the reputation service 136. The match scores may be ranked, and the highest ranked participating provider may be selected to fulfill the request. Once a participating provider is selected, connected inventory fulfillment service 134 may initiate a purchase of the participating provider's product with the requesting entity.

Figure 6:
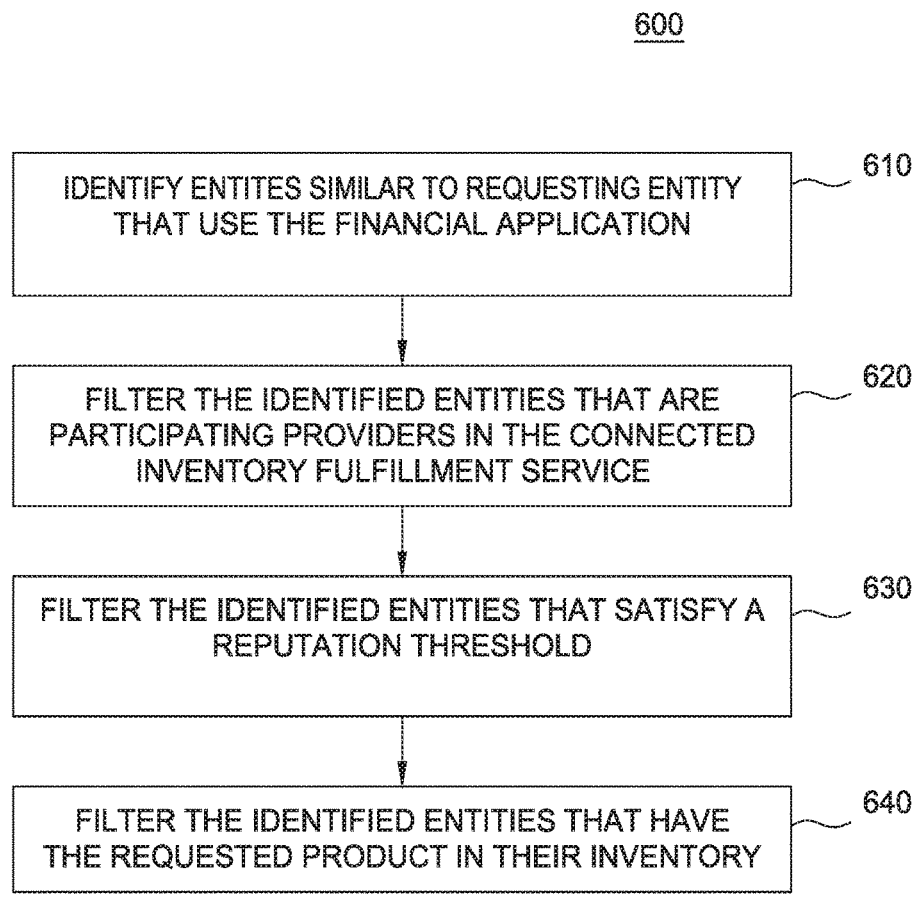
FIG. 6 illustrates a method for matching information in a request to inventory data stored using a financial application, according to one embodiment.

FIG. 6 illustrates a method 600 for matching a request to inventory data stored using a financial application agent 114, 124, according to one embodiment. The method 600 may be implemented at block 560 of method 500. The method 600 begins at block 610 with identifying entities similar to the requesting entity that use a financial application agent 114, 124 by identifying entities that use a financial application agent 114, 124 that have at least one characteristic in common with the requesting entity. For example, the common characteristics could include, size, type of entity, type of products in an inventory, or any other type of data stored using a financial application agent 114, 124.

At block 620, entities identified at block 610 are filtered to include only those entities that are participating providers in the connected inventory fulfillment service 134. At block 630, the identified entities are also filtered to include only the identified entities that satisfy a reputation threshold. Reputation information is retrieved from the reputation service 136, and any entities whose reputation data does not satisfy a threshold are filtered out. At block 640, the identified entities are also filtered to include only those entities that have the requested product indicated as available in their inventory data stored using a financial application agent 114, 124. The filtering at block 640 may also include filtering only the identified entities that have the requested product available in their inventory in a geographic location included in the request.

Figure 7:
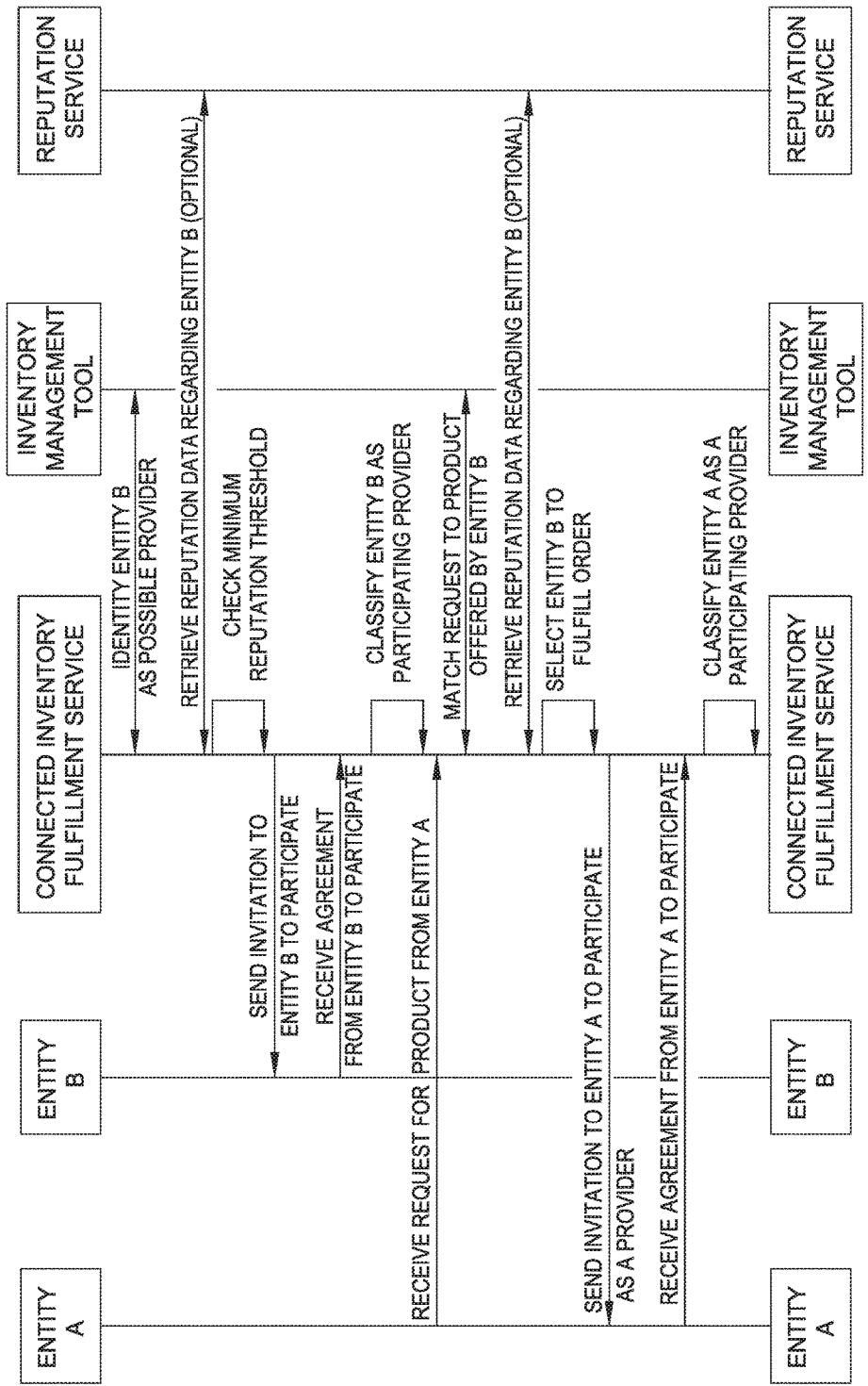
FIG. 7 illustrates the fulfillment of a request using a connected inventory fulfillment service, according to one embodiment.

FIG. 7 illustrates fulfilling a request from an entity using a connected inventory fulfillment service 134, according to one embodiment. As shown in FIG. 7, the connected inventory fulfillment service 134 identifies Entity B as a possible provider by identifying that Entity B stores and updates its inventory in real-time using an inventory management tool. For example, Entity B's inventory may be stored and updated in real time using an inventory management tool. The connected inventory fulfillment service 134 optionally may retrieve reputation data regarding entity B from the reputation service 136 to confirm that Entity B satisfies a reputation threshold. The connected inventory fulfillment service 134 then sends an invitation to Entity B to participate as a provider in the connected inventory fulfillment service 134. Once an agreement from Entity B to participate is received at the connected inventory fulfillment service 134, Entity B is classified as a participating provider by the connected inventory fulfillment service 134.

A request is received by the connected inventory fulfillment service 134 for a product from Entity A. For example, Entity A could be a bookstore located in a first geographic location, while Entity B could be a bookstore located in a different geographic location from Entity A. Entity A may have a customer in its store that is requesting a specific book for pickup in Entity B's geographic location. Entity A's request may include the specific book, requesting fulfillment in Entity B's geographic location. The connected inventory fulfillment service 134 matches Entity A's request to a book located in Entity B's inventory. The connected inventory fulfillment service 134 may optionally retrieve reputation data regarding Entity B. The connected inventory fulfillment service 134 then selects Entity B to fulfill the request from Entity A. The selection may be made using the reputation data for Entity B if retrieved. Connected inventory fulfillment service 134 may then initiate a purchase of Entity B's product with Entity A on behalf of Entity A's customer.

If Entity A uses the inventory management tool to store inventory data but is not a participating provider in the connected inventory fulfillment service 134, the connected inventory fulfillment service 134 sends an invitation to Entity A to participate as a provider in the connected inventory fulfillment service 134. The invitation could be a general invitation, or the invitation could invite Entity A to participate as a provider only with respect to the product included in Entity A's request. Reputation data regarding Entity A may optionally be retrieved to confirm that Entity A's reputation meets a reputation threshold before an invitation is sent to Entity A (not shown). The connected inventory fulfillment service 134 then receives an agreement from Entity A to participate as a provider in the connected inventory fulfillment service 134 and classifies Entity A as a participating provider.

Figure 8:
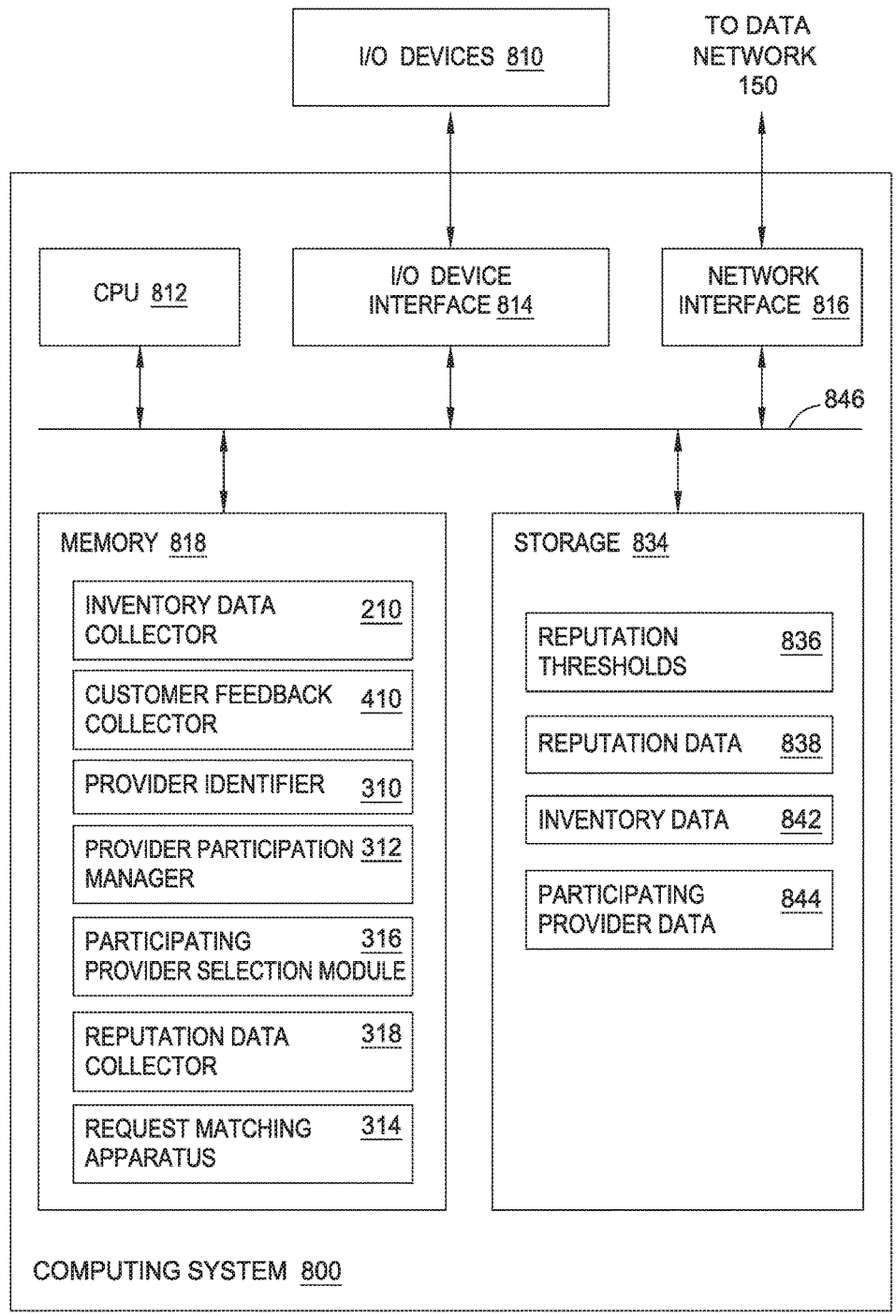
FIG. 8 illustrates an example computing system for implementing a connected inventory fulfillment service, according to one embodiment.

FIG. 8 illustrates an example computing system 800 for implementing a connected inventory fulfillment service 134, according to one embodiment. As shown, the computing system 800 includes, without limitation, a central processing unit (CPU) 812, one or more I/O device interfaces 814 which may allow for the connection of various I/O devices 810 (e.g., keyboards, displays, mouse devices, pen input, etc.) to the computing system 800, network interface 816, a memory 818, storage 834, and an interconnect 846.

CPU 812 may retrieve and execute programming instructions stored in the memory 818. Similarly, the CPU 812 may retrieve and store data residing in the storage 834. The interconnect 846 transmits programming instructions and data, among the CPU 812, I/O device interface 814, network interface 816, memory 818, and storage 834. CPU 812 can represent a single CPU, multiple CPUs, a single CPU having multiple processing cores, and the like. Additionally, the memory 818 represents random access memory. Furthermore, the storage 834 may be a disk drive. Although shown as a single unit, the storage 834 may be a combination of fixed or removable storage devices, such as fixed disc drives, removable memory cards or optical storage, network attached storage (NAS), or a storage area-network (SAN).

As shown, memory 818 includes inventory data collector 210, customer feedback collector 410, provider identifier 310, provider participation manager 312, request matching apparatus 314, participating provider selection module 316, and reputation data collector 318. Inventory data collector 210 retrieves inventory data collected through a business's inventory detection system. Provider identifier 310 identifies users of a financial application agent 114, 124 that have inventory data stored using a financial application agent 114, 124 that could participate as a provider in connected inventory fulfillment service 134. Provider participation manager 312 invites users to participate as providers in connected inventory fulfillment service 134, and classifies users as participating providers upon receipt of acceptance of the invitations. Request matching apparatus 314 matches a request for a product received by connected inventory fulfillment service 134 to participating providers that have the product available in their inventory. Participating provider selection module 316 selects a participating provider to fulfill the request. Reputation data collector 318 collects customer feedback concerning received products and/or providers. Storage 834 stores reputation thresholds 836, reputation data 838, inventory data 842, and participating provider data 844, which may be accessed when connected inventory fulfillment service 134 finds and selects a participating provider to fulfill a request.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for selecting a provider to fulfill a request for a product, the method comprising:
   receiving at a connected inventory fulfillment service, from an inventory management tool on a remote server, a request from a seller on behalf of a customer for a product;
   identifying, from a set of providers, a subset of providers based on information in the request, each provider in the subset associated with inventory data stored by the inventory management tool, wherein identifying the subject comprises filtering the set such that providers in the set that have not agreed to participate as providers in the connected inventory fulfillment service are not included in the subset;

determining, at the remote server for each provider in the subset of providers, a match score between the information in the request and the inventory data for the provider;

selecting a provider from the subset of providers based on the match scores; and initiating a purchase of the product with the seller on behalf of the customer and the provider.

2. The method of claim 1, wherein a geographic location of the product is specified in the request.

3. The method of claim 1, wherein each provider in the subset of providers has agreed to participate as a provider in the connected inventory fulfillment service.

4. The method of claim 3, wherein each provider in the subset of providers uses an agent of the inventory management tool to store inventory data at the remote server, has at least one characteristic in common with the seller, and satisfies a reputation threshold.

5. The method of claim 4, further comprising, for each provider in the subset of providers:

receiving, from a reputation service, reputation information related to the provider; and upon determining the reputation information does not satisfy the reputation threshold, filtering out the provider from the subset of providers.

6. The method of claim 1, further comprising:

sending an invitation to the seller to participate as a provider in the connected inventory fulfillment service.

7. The method of claim 1, wherein the provider is additionally selected based on at least one preference related to the product specified in the request.

8. The method of claim 1, wherein the seller uses the inventory management tool to store inventory data.

9. A non-transitory computer-readable storage medium containing instructions that, when executed by one or more processors, perform an operation for selecting a provider to fulfill a request for a product, the operation comprising:

receiving at a connected inventory fulfillment service, from an inventory management tool, a request from a seller on behalf of a customer for a product;

identifying, from a set of providers, a subset of providers, each provider in the subset associated with inventory data stored by the inventory management tool, wherein identifying the subject comprises filtering the set such that providers in the set that have not agreed to participate as providers in the connected inventory fulfillment service are not included in the subset;

determining, for each provider in the subset of providers, a match score between the information in the request and the inventory data for the provider;

selecting a provider from the subset of providers based on the match scores; and initiating a purchase of the product with the seller on behalf of the customer and the provider.

10. The computer-readable storage medium of claim 9, wherein a geographic location of the product is specified in the request.

11. The computer-readable storage medium of claim 9, wherein each provider in the subset of providers has agreed to participate as a provider in the connected inventory fulfillment service.

12. The computer-readable storage medium of claim 11, wherein each provider in the subset of providers uses an agent of the inventory management tool to store inventory data at the remote server, has at least one characteristic in common with the seller, and satisfies a reputation threshold.

13. The computer-readable storage medium of claim 12, further comprising, for each provider in the subset of providers:

receiving, from a reputation service, reputation information related to the provider; and upon determining the reputation information does not satisfy the reputation threshold, filtering out the provider from the subset of providers.

14. The computer-readable storage medium of claim 9, wherein the operation further comprises:

sending an invitation to the seller to participate as a provider in the connected inventory fulfillment service.

15. The computer-readable storage medium of claim 9, wherein the provider is additionally selected based on at least one preference related to the product specified in the request.

16. The computer-readable storage medium of claim 9, wherein the seller uses the inventory management tool to store inventory data.

17. A system, comprising:

one or more processors; and memory storing one or more applications, which, when executed on the one or more processors perform an operation for selecting a provider to fulfill a request for a product, the operation comprising:

receiving at a connected inventory fulfillment service, from an inventory management tool on a remote server, a request from a seller on behalf of a customer for a product;

identifying, from a set of providers, a subset of providers, each provider in the subset associated with inventory data stored by the inventory management tool, wherein identifying the subject comprises filtering the set such that providers in the set that have not agreed to participate as providers in the connected inventory fulfillment service are not included in the subset;

determining, at the remote server for each provider in the subset of providers, a match score between the information in the request and the inventory data for the provider;

selecting a provider from the subset of providers based on the match scores; and initiating a purchase of the product with the seller on behalf of the customer and the provider.

18. The system of claim 17, wherein a geographic location of the product is specified in the request.

19. The system of claim 17, wherein each provider in the subset of providers has agreed to participate as a provider in the connected inventory fulfillment service.

20. The system of claim 19, wherein each provider in the subset of providers uses an agent of the inventory management tool to store inventory data at the remote server, has at least one characteristic in common with the seller, and satisfies a reputation threshold.

* * * * *